United States Patent
Suzuki et al.

(10) Patent No.: US 7,795,174 B2
(45) Date of Patent: Sep. 14, 2010

(54) CATALYST FOR PURIFYING EXHAUST GASES

(75) Inventors: Hiromasa Suzuki, Toyota (JP); Takahiko Fujiwara, Susono (JP); Mamoru Ishikiriyama, Fujieda (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/921,026

(22) PCT Filed: May 25, 2006

(86) PCT No.: PCT/JP2006/310956

§ 371 (c)(1),
(2), (4) Date: Nov. 26, 2007

(87) PCT Pub. No.: WO2006/126734

PCT Pub. Date: Nov. 30, 2006

(65) Prior Publication Data

US 2009/0082199 A1    Mar. 26, 2009

(30) Foreign Application Priority Data

May 26, 2005    (JP)    ............................. 2005-153781

(51) Int. Cl.
*B01J 23/644*    (2006.01)
*B01J 23/18*    (2006.01)
*B01J 23/40*    (2006.01)

(52) U.S. Cl. ...................... 502/353; 502/325

(58) Field of Classification Search ................. 502/326, 502/325, 352, 353
See application file for complete search history.

(56) References Cited

U.S. PATENT DOCUMENTS 4,931,419 A * 6/1990 Blanchard et al. ........... 502/304

(Continued)

FOREIGN PATENT DOCUMENTS

CN    1205652 A    1/1999

(Continued)

OTHER PUBLICATIONS

Chinese Office Action dated Mar. 6, 2009, (CN2006800176040).

(Continued)

*Primary Examiner*—Timothy C Vanoy
*Assistant Examiner*—Daniel Berns
(74) *Attorney, Agent, or Firm*—Finnegan, Henderson, Farabow, Garrett & Dunner, LLP

(57) ABSTRACT

A catalyst for purifying exhaust gases includes a carrier substrate and a catalyst layer which is carried on the carrier substrate and contains a noble metal, a porous oxide and an additional oxide containing at least one selected from the group consisting of Ni, Bi, Sn, Fe, Co, Cu and Zn. Only a downstream section of the carrier substrate, which is located on a downstream side of an exhaust gas stream contains the additional oxide, whereas an upstream section of the carrier substrate does not contain the additional oxide. With this arrangement, in the upstream section of the carrier substrate, the noble metal and the additional oxide do not exist together so that the noble metal is not deteriorated with the additional oxide. As a result, in the upstream section, the purification performance as a three-way catalyst is favorably achieved, thereby restraining the emission of $H_2S$ while maintaining the three-way performance.

5 Claims, 2 Drawing Sheets

U.S. PATENT DOCUMENTS

| | | | |
|---|---|---|---|
| 4,939,113 A * | 7/1990 | Tauster et al. | 502/251 |
| 5,705,265 A * | 1/1998 | Clough et al. | 428/307.3 |
| 6,217,831 B1 * | 4/2001 | Suzuki et al. | 422/177 |
| 6,548,446 B1 * | 4/2003 | Koermer et al. | 502/249 |
| 2002/0103078 A1 * | 8/2002 | Hu et al. | 502/326 |

FOREIGN PATENT DOCUMENTS

| | | |
|---|---|---|
| CN | 1308557 A | 8/2001 |
| JP | 8-15554 | 2/1996 |
| JP | 2001-70754 | 3/2001 |
| JP | 2004-523686 | 8/2004 |
| KR | 20020081457 | 10/2002 |
| WO | WO 97/23278 | 7/1997 |
| WO | WO 00/02645 | 1/2000 |
| WO | WO 01/74476 A1 | 10/2001 |
| WO | WO 2004/022481 | 3/2004 |

OTHER PUBLICATIONS

.Korean Office Action dated Jan. 19, 2009, (KR2007-7027483).
International Search Report, PCT/JP2006/310956 (Feb. 8, 2007).
Written Opinion of the International Searching Authority, WO/2006/126734 (Nov. 26, 2007).

* cited by examiner

CATALYST FOR PURIFYING EXHAUST GASES

TECHNICAL FIELD

The present invention relates to a catalyst adapted to purify exhaust gases from internal combustion engines of motor vehicles, etc., and more particularly, to a catalyst adapted to purify exhaust gases, which is capable of restraining emission of hydrogen sulfide (H2S).

BACKGROUND ART

Now, three-way catalysts have been widely used as the catalysts adapted to purify nitrogen oxide (NOx), carbon monoxide (CO), and hydrocarbon (HC) in exhaust gases from motor vehicles, etc. The three-way catalyst is composed of a porous oxide carrier or support such as alumina, ceria, zirconia, ceria-zirconia solid solution, etc., which carries a noble metal such as platinum (Pt), rhodium (Rh), palladium (Pd), etc. The three-way catalyst oxidizes HC and CO and reduces NOx to purify the same. These reactions proceed most efficiently in such an atmosphere that oxidation components and reduction components exist in approximately equivalent, and consequently, in the motor vehicles on which the three-way catalysts are mounted, the air-to-fuel ratio has been controlled such that combustion is carried out at about the theoretical air-to-fuel ratio (stoichiometric ratio) (A/F=about 14.6±0.2).

The three-way catalysts, however, exhibit the problem that when an exhaust gas atmosphere shifts to a reduction side, sulfur oxide in the exhaust gases is reduced and emitted as $H_2S$. Accordingly, in the method of publication of examined Japanese patent application No. 08-15554 (Document 1), oxide of Ni or Cu is added as a component of the three-way catalyst. Oxide of Ni or Cu forms $SO_3$ or $SO_4$ from $SO_2$ in an oxidation atmosphere, and stores sulfur components as sulfides such as $Ni_2S_3$, ex. in a reduction atmosphere to restrain the emission of $H_2S$.

Publication of unexamined Japanese patent application No. 2001-70754 (Document 2) discloses a device for purifying exhaust gases, wherein a three-way catalyst to which nickel oxide is added is disposed on a downstream side of a NOx strage reduction catalyst device which contains NOx strage components capable of decreasing the emission of NOx in the lean region. And Publication of unexamined international application No. 2004-523686 (Document 3) discloses a catalyst composite of which an upstream section contains a NOx strage component, and a downstream section contains a platinum component and a SOx adsorbing component such as nickel oxide, etc. However, in Documents 2 and 3, added nickel oxide deteriorates noble metal so that the original purification performance of the three-way catalyst by virtue of the platinum component, etc. lowers, and consequently, the purification of CO and HC becomes insufficient.

DISCLOSURE OF THE INVENTION

In view of the above-described problems, the present invention has an object of providing a catalyst for purifying exhaust gases, which is capable of restraining the emission of H2S while maintaining the purification performance as a three-way catalyst.

The catalyst for purifying exhaust gases in accordance with the present invention is characterized in that the catalyst includes a carrier substrate, and a catalyst layer which is carried on the carrier substrate, and contains a noble metal, a porous oxide and an additional oxide containing at least one selected from the group consisting of Ni, Bi, Sn, Fe, Co, Cu and Zn, and that only a downstream section of the carrier substrate, which is located on a downstream side of an exhaust gas stream, contains the above-described additional oxide, whereas an upstream section of the carrier substrate does not contain the above-described additional oxide.

With the catalyst for purifying exhaust gases in accordance with the present invention, in the upstream section of the carrier substrate, the noble metal and the additional oxide do not exist together so that the noble metal is not deteriorated with the additional oxide. As a result, in the upstream section, the purification performance as the three-way catalyst is preferably exhibited. Accordingly, the catalyst for purifying exhaust gases in accordance with the present invention can restrain the emission of H2S while maintaining the three-way performance.

BEST MODE FOR CARRYING OUT THE INVENTION

Figure 1:
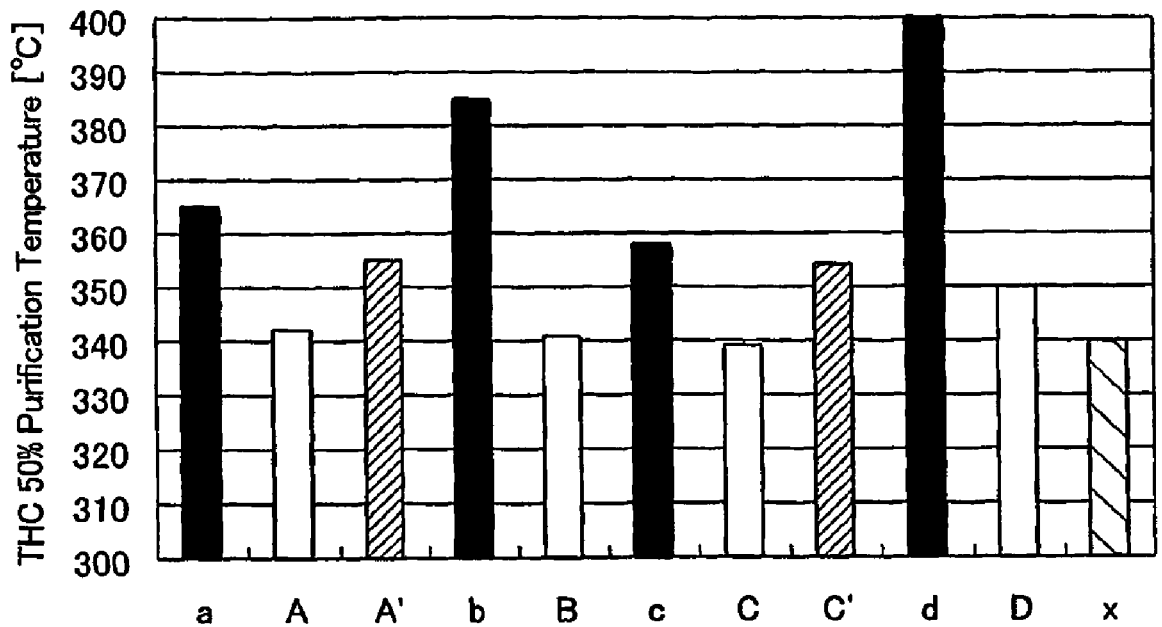
FIG. 1 is a graph showing the THC 50% purification temperature of catalysts for purifying exhaust gases in embodiments and comparative examples.

Hereinafter, in order to disclose the present invention in more detail, the best mode for carrying out the present invention will be explained.

The catalyst for purifying exhaust gases in accordance with the present invention includes a carrier substrate, and a catalyst layer which is carried on the carrier substrate, and is composed of a noble metal, a porous oxide and an additional oxide containing at least one selected from the group consisting of nickel (Ni), bismuth (Bi), tin (Sn), iron (Fe), cobalt (Co), copper (Cu) and zinc (Zn). And only a downstream section of the carrier substrate, which is located on a downstream side of an exhaust gas stream, contains the above-described additional oxide, whereas an upstream section of the carrier substrate does not contain the above-described additional oxide. Namely, in accordance with the present invention, the upstream section of the catalyst for purifying exhaust gases corresponds to a conventional three-way catalyst, whereas the downstream section thereof is composed of the additional oxide in addition to the conventional three-way catalyst.

Alumina, silica, titania, ceria, zirconia or a composite oxide such as a ceria-zirconia solid solution, etc., which is composed of a plurality of these materials, is available as the porous oxide, and one or more of these porous oxides can be used. In this case, it is preferable that at least active alumina with a great specific surface area is contained. And where the oxide exhibiting an oxygen adsorbing and emitting ability, such as a ceria-zirconia solid solution, is used, the variations in atmosphere can be made gentle to further improve the three-way activity.

Oxides of metals including at least one selected from the group consisting of Ni, Bi, Sn, Fe, Co, Cu and Zn can be used as the additional oxide. The additional oxide may be the oxide capable of changing $SO_2$ to $SO_3$ or $SO_4$ in an oxidation atmosphere, and storing a sulfur component as sulfide such as $Ni_2S_3$ in a reduction atmosphere. Therefore, the additional oxide may form a composite oxide with metal elements other than the above-described metal elements, provided that sulfur components can be stored and the emission of $H_2S$ can be restrained. In addition, only one of the above-described additional oxides may be used, or two or three additional oxides may be used together. By adding two or more additional oxides as a composite oxide, the amount of the formed $H_2S$ further decreases, as compared with the case one additional oxide is included by the same amount, so as to be preferable. And it is preferable that the additional oxide is added to the catalyst in the amount of 0.05 to 0.5 mole per liter of the catalyst.

And, as disclosed before, the additional oxide deteriorates the noble metal. As the noble metal is deteriorated, the original purification performance of the three-way catalyst, which is by virtue of the noble metal, lowers. Therefore, with the catalyst for purifying exhaust gases in accordance with the present invention, by forming two sections, one containing the additional oxide and the other containing no additional oxide, there is provided the arrangement that the section containing no additional oxide can mainly exhibits a purification performance as the three-way catalyst, whereas the section containing the additional oxide can mainly restrain the emission of $H_2S$ effectively.

Furthermore, as a result of studies by the present inventors, etc., it has been clarified that the components of the exhaust gases, which contain sulfur, move from an upstream side to a downstream side of the carrier substrate while repeating the emission and adsorption thereof. With the movement of the components containing sulfur, the adsorption position of the sulfur components also shifts to the downstream side so that in order to restrain the emission of $H_2S$, it is favorable to dispose the additional oxide on the downstream side of the carrier substrate and sufficiently adsorb and store the sulfur components on the downstream side. Accordingly, the catalyst for purifying exhaust gases in accordance with the present invention is arranged such that only the downstream section of the carrier substrate, which is located on the downstream side of the exhaust gas stream, contains the additional oxide and that the upstream section of the carrier substrate, which is located on the upstream side of the exhaust gas stream, is free from additional oxide, whereby the emission of $H_2S$ is effectively restrained.

And the additional oxide can be used by physically mixing it with the porous oxide, but can be also added thereto by the sol-gel method, co-precipitation method, etc. For example, a precipitate is deposited from an aqueous solution of water soluble compounds such as nitrate, etc., which contain at least one of the above-described metal elements, and the deposited precipitate is carried on alumina powder, etc. and calcined, whereby the additional oxide can be obtained.

Noble metals which oxidize HC and CO or reduce NOx with their catalyses such as Pt, Rh, Pd, etc. can be used preferably. It is also favorable to use Pt which is excellent in oxidation activity and Rh which is excellent in reduction activity together. Noble metals may be partly carried on the additional oxide, but it is desirable that the most part thereof is carried on the porous oxide.

The carrying amount of noble metals may be similar to that in the conventional three-way catalyst, and may be arbitrarily selected in accordance with the required performance. The preferred carrying amount depends on the kind of noble metals, but ranges from 0.1 to 10 g per liter of the catalyst layer.

The catalyst for purifying exhaust gases in accordance with the present invention includes a carrier substrate for carrying the catalyst layer. Honeycomb-like structures, etc. composed of conventionally available ceramics and metals may be used as the carrier substrates. In order to carry the catalyst layer on the carrier substrate, the honeycomb structure, for example, may be wash-coated with a slurry containing the porous oxide and the additional oxide, and calcined to form a coat layer, and the coat layer is made to carry the noble metal with the adsorption carrying method or the water-absorption carrying method. Alternatively, a catalyst powder in which the noble metal has been previously carried on the porous oxide is prepared, and the additional oxide is mixed to the prepared catalyst powder to form a coat layer.

The ratio of the upstream section and the downstream section is not limited specifically, but it is preferable that the volume of the upstream section of the carrier substrate is greater than that of the downstream section thereof.

The catalyst for purifying exhaust gases in accordance with the present invention is not limited to the above-described embodiment. For example, in order to add another function to the catalyst layer, another material may be added as required, provided that the effect of the catalyst for purifying exhaust gases in accordance with the present invention is not damaged.

Catalysts for purifying exhaust gases were prepared based on the above-described embodiment. Hereinafter, embodiments of the catalyst for purifying exhaust gases in accordance with the present invention will be concretely explained along with comparative examples.

Catalysts for purifying exhaust gases of embodiments and comparative examples (samples A~C, a~c, A', C' and x) were prepared in the following method.

[Preparation of Slurry]

75 parts by weight of a cerium-zirconium solid solution (molar ratio $CeO_2:ZrO_2:Y_2O_3=65:30:5$), 120 parts by weight of an activated alumina, and an alumina binder (3 parts by weight of alumina hydrate, 44 parts by weight of an aqueous solution of 40% alumina nitrate) were mixed with a predetermined amount of a pure water, and subjected to a milling operation to prepare a slurry $S_0$.

And a slurry $S_B$ was prepared similarly to the slurry $S_0$ except that bismuth oxide was added. 2 kinds (138 parts by weight, 414 parts by weight) of the slurry $S_B$, which are different in content of bismuth oxide, were prepared.

And a slurry $S_B$ was prepared similarly to the slurry $S_0$ except that tin oxide was added. 2 kinds (90 parts by weight, 180 parts by weight) of the slurry $S_S$, which are different in content of tin oxide, were prepared.

And a slurry $S_F$ was prepared similarly to the slurry $S_0$ except that nickel oxide was added. 2 kinds (50 parts by weight, 150 parts by weight) of the slurry $S_N$, which are different in content of nickel oxide, were prepared.

And a slurry $S_F$ was prepared similarly to the slurry $S_0$ except that iron oxide was added. 2 kinds (107 parts by weight, 321 parts by weight) of the slurry $S_F$, which are different in content of iron oxide, were prepared.

Preparation of Catalyst for Purifying Exhaust Gases

Comparative Example 1

Sample a

A honeycomb carrier (1.1 liter) having a cell density of 400 cpsi, a wall thickness of 100 μm, a diameter of 103 mm, and a length of 130 mm was prepared as a carrier substrate. This honeycomb carrier was wash-coated with the slurry $S_B$ (bismuth oxide content: 138 parts by weight), dried at 120° C. and calcined at 650° C. for 3 hours.

Next, after coated, the carrier substrate was immersed in an aqueous solution of rhodium nitrate with a predetermined concentration for adsorbing and carrying the same, taken from the aqueous solution, dried at 120° C., and calcined at 500° C. for 1 hour to carry Rh. Furthermore, the carrier substrate was made to adsorb with a solution of dinitro diammine platinum of a predetermined concentration, taken from the solution, dried at 120° C. and calcined at 500° C. for 1 hour, thereby carrying Pt. As a result, a sample a was obtained. The amount of the noble metal carried per liter of the carrier substrate was 0.2 g/L in the case of Rh, and 1.0 g/L in the case of Pt.

Embodiment 1

Sample A

Sample A was prepared similarly to Comparative example 1 (sample a) except that the upstream section of the honeycomb carrier, which is located on the upstream side of the exhaust gas stream, (⅔ of the honeycomb carrier and 87 mm from one opening end face: hereinafter will be briefly referred to as "upstream section") was coated with the slurry $S_O$, whereas the downstream section of the honeycomb carrier (⅓ of the honeycomb carrier and 43 mm from the other opening end face: hereinafter will be briefly referred to as "downstream section") was coated with the slurry $S_B$ (bismuth oxide content: 414 parts by weight).

Sample A' (Comparative example 1-2) was prepared by disposing the honeycomb carrier of the sample A in the exhaust gas stream such that the upstream side and the downstream side thereof were inverted from each other, and is substantially similar to Sample A.

Comparative Example 2

Sample b

Sample b was prepared similarly to Comparative example 1 (sample a) except that the honeycomb carrier was coated with the slurry $S_S$ (tin oxide content: 90 parts by weight) instead of the slurry $S_B$.

Embodiment 2

Sample B

Sample B was prepared similarly to Comparative example 1 (sample a) except that the upstream section of the honeycomb carrier was coated with the slurry $S_O$, whereas the downstream section of the honeycomb carrier was coated with the slurry $S_S$ (tin oxide content: 180 parts by weight), instead of the slurry $S_B$.

Comparative Example 3

Sample c

Sample c was prepared similarly to Comparative example 1 (sample a) except that the honeycomb carrier was coated with the slurry $S_N$ (nickel oxide content: 50 parts by weight) instead of the slurry $S_B$.

Embodiment 3

Sample C

Sample C was prepared similarly to Comparative example 1 (sample a) except that the upstream section of the honeycomb carrier was coated with the slurry $S_O$, whereas the downstream section of the honeycomb carrier was coated with the slurry $S_N$ (nickel oxide content: 150 parts by weight), instead of the slurry $S_B$.

Sample C' (Comparative example 3-2) was prepared by disposing the honeycomb carrier of the sample C in the exhaust gas stream such that the upstream side and the downstream side thereof were inverted from each other, and is substantially similar to Sample C.

Comparative Example 4

Sample d

Sample d was prepared similarly to Comparative example 1 (sample a) except that the honeycomb carrier was coated with the slurry $S_F$ (iron oxide content: 107 parts by weight) instead of the slurry $S_B$.

Embodiment 4

Sample D

Sample D was prepared similarly to Comparative example 1 (sample a) except that the upstream section of the honeycomb carrier was coated with the slurry $S_O$, whereas the downstream section of the honeycomb carrier was coated with the slurry $S_F$ (iron oxide content: 321 parts by weight), instead of the slurry $S_B$.

Comparative Example 5

Sample x

Sample x was prepared similarly to Comparative example 1 (sample a) except that the honeycomb carrier was coated with the slurry So instead of the slurry $S_B$.

[Experiment and Evaluation]

[Purification Performance Test]

The above-described samples were respectively mounted on an exhaust system of an engine bench on which a V type 8 cylinders 4.0 L engine was mounted, and a durability test was carried out by holding each sample at a catalyst bed temperature of 900° C. for 100 hours while alternating A/F=15 and A/F=14 with 1 Hz.

The samples after the durability test were respectively mounted on a vehicle on which an in-line 4 cylinders 2.4 L engine was mounted as an underfloor catalyst thereof, the combustion of the engine was controlled in the theoretical air-to-fuel ratio, and the purification rate of the HC components was measured while raising the temperature from 200° C. to 450° C. at a rate of 10° C. per minute by way of a heat exchanger. From the measurement results, the temperatures at which 50% of the HC components can be purified were calculated. The calculated temperatures were shown in Table 1 and FIG. 1 as "THC 50% purification temperature".

And the samples after the durability test were respectively mounted on a vehicle on which an in-line 4 cylinders 2.4 L engine was mounted as an underfloor catalyst thereof, and the exhaust gases before and after the catalyst were analyzed while sweeping the air-to-fuel ratio from 13.5 to 15.5 by changing the combustion conditions, and the CO purification rate and the $NO_x$ purification rate were measured. The temperature of gases when entering the catalyst was 400° C. And the purification rate at the point where the CO purification curve and the $NO_x$ purification curve cross each other was determined as "CO—NO$_x$ cross purification rate". CO—NO$_x$ cross purification rate is shown in Table 1 and FIG. 2.

[H$_2$S Forming Amount Test]

The above-described samples were respectively mounted on a vehicle on which an in-line 4 cylinders 2.4 L engine was mounted as an underfloor catalyst thereof, and the engine was operated at 40 km/hr for 1 hour while maintaining the running pattern such that the temperature of the underfloor catalyst bed was kept to 400° C. Next, a throttle was fully opened to increase the speed to 110 km/hr in 10 seconds, and after the speed was kept for 10 seconds, the speed was reduced and stopped in 20 seconds, and the engine was idled for 10 seconds after stopping of the speed.

Figure 3:
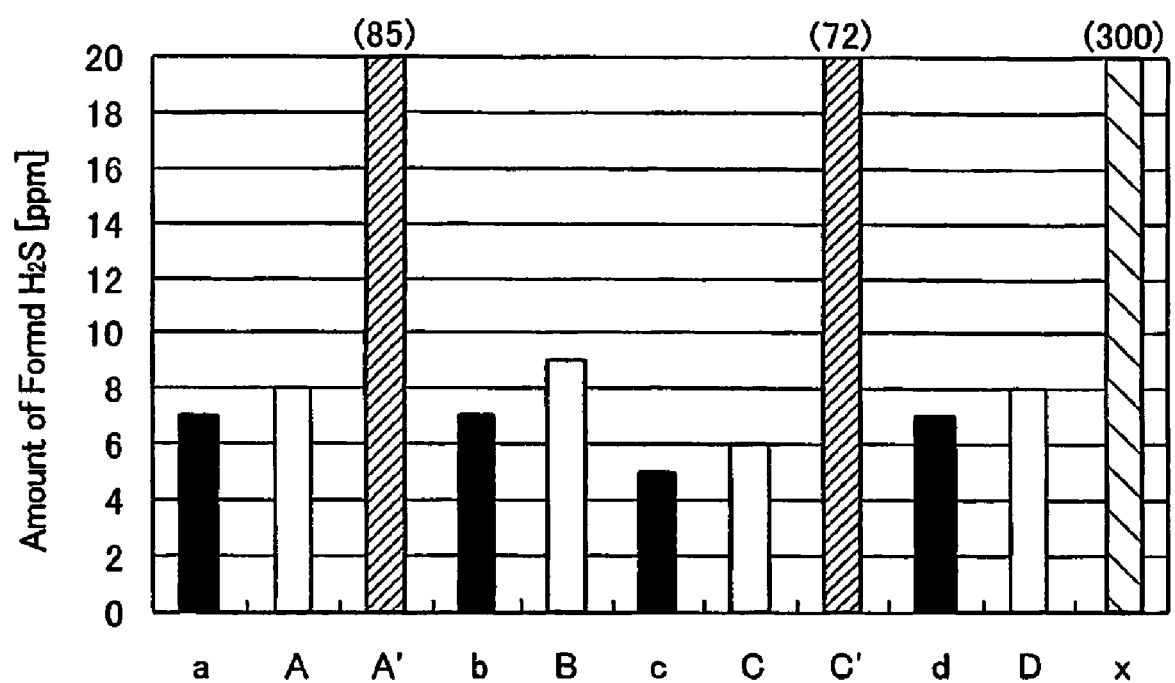
FIG. 3 is a graph showing the amount of formed $H_2S$ in catalysts for purifying exhaust gases in embodiments and comparative examples.

The concentration of H$_2$S in exhaust gases in an idling state was measured, and the peak concentration thereof was shown in Table 1 and FIG. 3 as "amount of formed H$_2$S".

TABLE 1

|  |  | Coated Slurry |  | THC50% Purification Temperature [° C.] | CO—NOx Cross Purification Rate [%] | Amount of Formed H$_2$S [ppm] |
| --- | --- | --- | --- | --- | --- | --- |
|  | Sample No. | Upstream Section | Downstream Section |  |  |  |
| Comparative Example 1 | a |  | S$_B$ | 365 | 91.2 | 7 |
| Embodiment 1 | A | S$_0$ | S$_B$ | 342 | 96.0 | 8 |
| Comparative Example 1-2 | A' | S$_B$ | S$_0$ | 355 | 93.4 | 85 |
| Comparative Example 2 | b |  | S$_S$ | 385 | 87.0 | 7 |
| Embodiment 2 | B | S$_0$ | S$_S$ | 341 | 96.1 | 9 |
| Comparative Example 3 | c |  | S$_N$ | 358 | 94.0 | 5 |
| Embodiment 3 | C | S$_0$ | S$_N$ | 339 | 96.2 | 6 |
| Comparative Example 3-2 | C' | S$_N$ | S$_0$ | 354 | 95.4 | 72 |
| Comparative Example 4 | d |  | S$_F$ | 400 | 82.0 | 7 |
| Embodiment 4 | D | S$_0$ | S$_F$ | 350 | 95.8 | 8 |
| Comparative Example 5 | x |  | S$_0$ | 340 | 96.2 | 300 |

[Evaluation]

Figure 2:
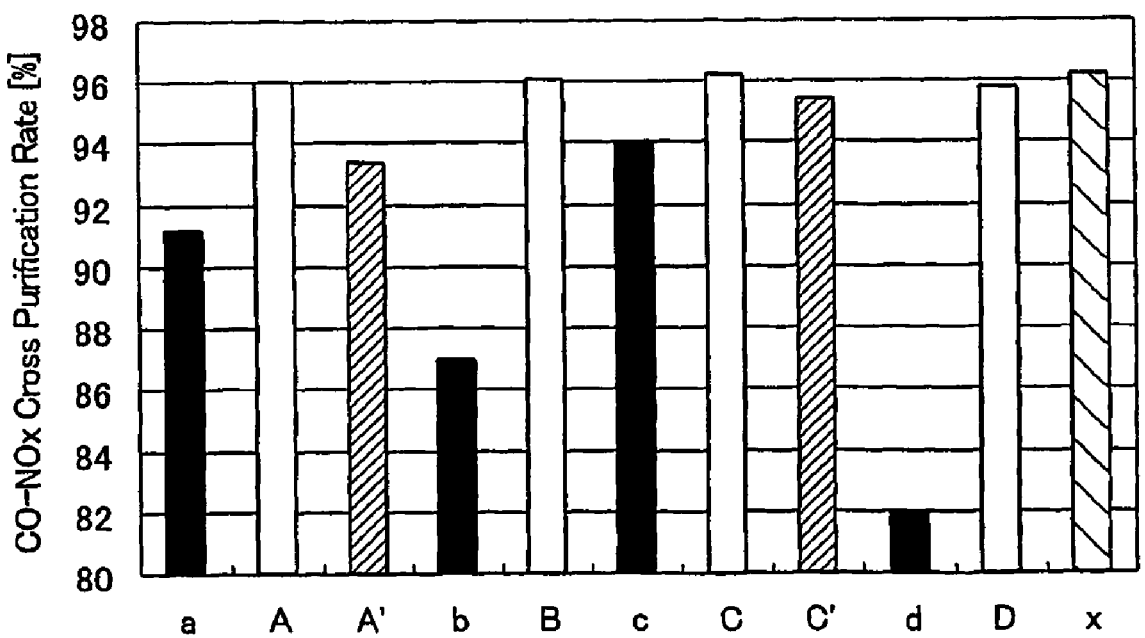
FIG. 2 is a graph showing the CO—NOx cross purification rate of catalysts for purifying exhaust gases in embodiments and comparative examples.

Graphs shown in FIG. 1 and FIG. 2 show that the samples A, B and C in which only the downstream sections of the honeycomb carriers were coated with the slurries containing the additional oxides exhibit the purification performance as the three-way catalyst, which is on a similar level to that of the sample x containing no additional oxide. And the graph of FIG. 3 shows that the samples A, B and C can greatly restrain the formation of H$_2$S.

Accordingly, the samples A, B and C in which only the downstream sections had been coated with the slurries containing the additional oxides could restrain the formation of H$_2$S while maintaining the purification performance as the three-way catalyst.

In the samples A' and C' in which the coating positions of the additional oxides were respectively inverted from those of the sample A and sample C (namely, only the upstream sections were coated with slurries containing the additional oxides), the amount of formed H$_2$S is remarkably great. And the samples a, b, c and d of which the honeycomb carriers contain the additional oxides homogeneously, achieve enhanced effect of restraining the formation of H$_2$S, but the purification performance as the three-way catalyst was degraded due to the deterioration of noble metals caused by the additional oxides.

INDUSTRIAL APPLICABILITY

The catalyst for purifying exhaust gases in accordance with the present invention is useful as the three-way catalyst for motor vehicles, but is not limited to motor vehicles, provided that the combustion is effected in near a stoichiometric to oxidation atmosphere and in a reduction atmosphere regardless of the control of the combustion.

The invention claimed is:

1. A catalyst for purifying exhaust gases comprising:

a carrier substrate having an upstream section located on an upstream side of an exhaust gas stream and a downstream section located on a downstream side of the exhaust gas stream;

an upstream catalyst layer carried on the upstream section of said carrier substrate, comprising a noble metal and a porous oxide; and a downstream catalyst layer carried on the downstream section of said carrier substrate, comprising a noble metal, a porous oxide, and an additional oxide, said additional oxide comprising bismuth oxide;

wherein only the downstream catalyst layer comprises said additional oxide;

wherein the upstream catalyst layer does not comprise said additional oxide; and wherein the upstream section of said carrier substrate and the downstream section of said carrier substrate are defined by an integral, unitary piece of material.

2. The catalyst for purifying exhaust gases of claim 1, wherein the noble metal of the upstream catalyst layer and the noble metal of the downstream catalyst layer are the same noble metal.

3. The catalyst for purifying exhaust gases of claim 1, wherein the carrier substrate is a honeycomb carrier.

4. The catalyst for purifying exhaust gases of claim 1, wherein an amount of the additional oxide is 0.05 to 0.5 mole per liter of the catalyst.

5. The catalyst for purifying exhaust gases of claim 1, wherein a volume of the upstream section of said carrier substrate is greater than a volume of the downstream section of said carrier substrate.

* * * * *